United States Patent [19]

Uberbacher

[11] 4,218,113
[45] Aug. 19, 1980

[54] OPTICAL FIBER CONNECTOR APPARATUS

[75] Inventor: Edward C. Uberbacher, Raleigh, N.C.

[73] Assignee: International Business Machines Corporation, Armonk, N.Y.

[21] Appl. No.: 935,434

[22] Filed: Aug. 21, 1978

[51] Int. Cl.² .............................................. G02B 5/14
[52] U.S. Cl. ............................................... 350/96.21
[58] Field of Search ................ 350/96.20, 96.21, 96.22

[56] References Cited

U.S. PATENT DOCUMENTS

| 3,871,744 | 3/1975  | Bridger et al.   | 350/96.21 |
| 3,885,859 | 5/1975  | Dalgleish et al. | 350/96.21 |
| 3,923,371 | 12/1975 | Dalgleish        | 350/96.21 |
| 3,948,582 | 4/1976  | Martin           | 350/96.21 |

FOREIGN PATENT DOCUMENTS 2291510  6/1976  France ........................ 350/96.22
1463350  2/1977  United Kingdom .............. 350/96.20

OTHER PUBLICATIONS

"*Fiber Optic Connectors*" Data Sheet No. 57B, Mar. 1978 Cablewave Systems Inc.

*Primary Examiner*—Stewart J. Levy
*Attorney, Agent, or Firm*—Edward H. Duffield

[57] ABSTRACT

An improved optical fiber connector is described in which the necessity for tight tolerances on concentricity, sleeve diameters and sleeve bores is eliminated in a low-cost easily constructed and optically low loss device. A single precision tunnel device is used to provide alignment and abuttment between two free optically transmissive fibers. Cooperative mechanism between the tunnel device and fiber holders is utilized to guide the fiber into the precision tunnel.

5 Claims, 6 Drawing Figures

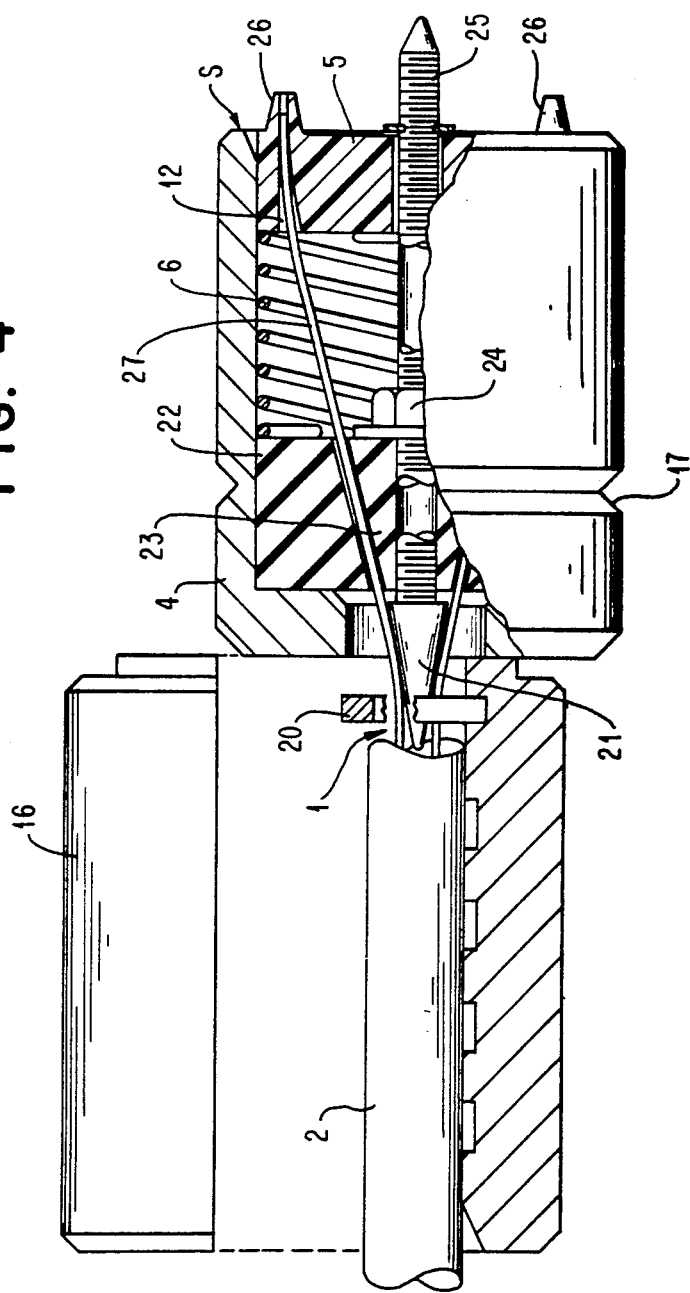

OPTICAL FIBER CONNECTOR APPARATUS

TECHNICAL FIELD

This invention relates to optical path connectors in general and to fiber optic data communications fiber connections in particular.

PRIOR ART

The past several years have seen a major portion of the industry adopt any of a variety of optical connectors. Connectors have been utilized for multifiber bundles, single fiber channels and to channel connector terminations where light sources or sensors are involved.

The primary objective of all optical connectors is to provide for precise alignment of the two small optically transmissive fibers without excessive light loss. Separation between the ends of the fibers must be reduced or eliminated, displacement of the end of the fibers relative to one another even though in the same plane, must be reduced and eliminated, and any angularity or difference in angularity near the juncture of the fibers must be reduced insofar as possible in order to provide an interconnection that dissipates only a small amount of transmitted light energy.

A typical approach in the prior art to facilitate handling of the fibers and the provision of the desired precision and connection is to place a connector sleeve around the end of the fibers, thus increasing the effective size of the fiber end. This solution to the problem becomes in itself a new problem. First, a sleeve that is used must have a bore that closely matches the size of the fiber used. Since many different fiber diameters are normally employed, a variety of sleeve bores of precision diameter must be supplied. Secondly, the bore must also be concentric with the outside diameter of the sleeve, since it is the outside diameter of the sleeve that will interface with the mechanical components to align the fibers. A typical approach is to use two such sleeve assemblies in a common connector tunnel to complete the connection. The tunnel therefore must also contain a bore that will accept various sizes of sleeve assemblies. Many dimensions must be carefully controlled to create accurate alignment in such a device. A control that must be observed are control of sleeve bore, concentrically between inner bore and outer diameter of the sleeve, the outside diameter of the sleeve itself and the diameter of the tunnel bore.

Since each of these controls may have a dimensional tolerance, which can be additive or subtractive at random, it is apparent that twice the sum of the total dimensional tolerances of the four different factors must be less than the size of the fiber itself it any light is to be transmitted. A typical fiber optic diameter is on the order of 3 mils. This fact, taken in light of the various controls that must be exercised, will show that the average dimensional tolerance must be less than ½ mil. This dictates a necessarily precision and expensive manufacturing operation to create a viable interconnection system for fiber optics.

OBJECTS

In view of the foregoing difficulties in the known prior art, it is an object of the present invention to provide an improved fiber optic connection apparatus which eliminates the bulk of the dimensional tolerance controls required in the prior art.

A second object of this invention is to provide a more universal type of fiber optic connector which can be utilized with a variety of different fiber diameters without modification.

BRIEF SUMMARY

The foregoing and yet other unenumerated objects of the present invention are provided by utilizing a single precision bore diameter connection tunnel element together with a cooperating housing and fiber optic holding structure that supports a stripped single or multi-fiber optic cable and facilitates automatic guidance of the free fiber optic end into the precision tunnel bore. The tunnel bore and length are the only critical dimensions that need be controlled in the present invention. The bore of the tunnel must match the size of the fiber being employed and this is an easily controlled tolerance. The total insertion depth of the fiber optic element must also be carefully controlled, but this is provided by having a flange of precision thickness on the tunnel connector which separates the fiber optic holding assemblies from one another by a precise amount, thus limiting the total insertion depth of the fiber. The end of the fiber must be positioned from the leading edge of the holder or housing by a carefully controlled dimension which is determined precisely during the cable and housing assembly.

BRIEF DESCRIPTION OF DRAWINGS

The invention will presently be described with reference to preferred embodiments thereof which will be further detailed and explained with reference to the drawings in which:

FIG. 4 illustrates a preferred alternative of the embodiment for use with multi-fiber optical cables.

DETAILED SPECIFICATION

Figure 1:
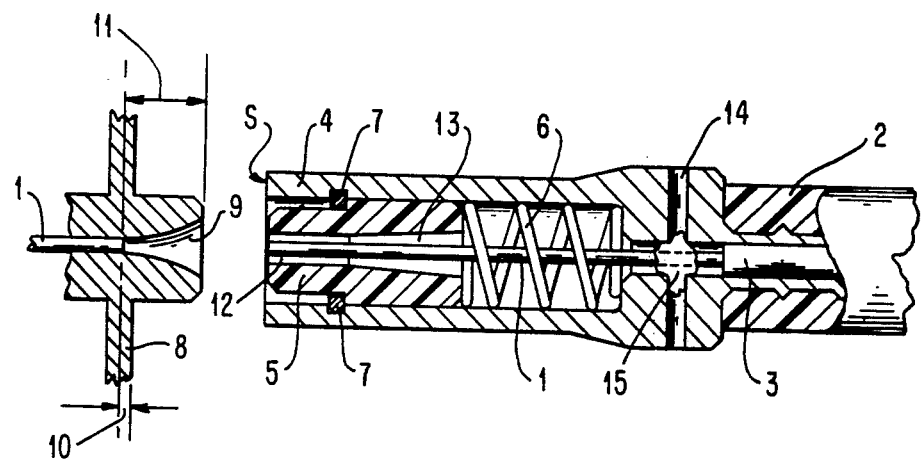
FIG. 1 illustrates a cross-sectional view of a preferred embodiment of the invention showing the housing and supporting means for the fiber optic conductor and the cooperating connector structure that is utilized.

Turning to FIG. 1, a preferred embodiment of the present invention is illustrated in a schematic cross-section view. The structure shown is intended for supporting, guiding and bringing into optically transmissive abuttment, one or more optical fibers on the order of diameter approximating that of a hair. The connector illustrated can be produced in mass volume without the necessity for precision dimensional control of the various housing components and enables the connector apparatus to be produced at standard dimensional tolerances for use with a wide range of fiber diameters without hardware changes. The normal dimensional requirements of precise control of concentricity of the components is eliminated in the present connector which results in reduced manufacturing assembly cost.

In FIG. 1, the fiber optical member 1 may be either a glass or plastic fiber as is well known in the art. Fiber 1 is contained in a plastic jacketed conductor cable having an outer plastic protective shield 2 and inner plastic isolator 3. A housing for the fiber optic support and guidance structure is illustrated as 4. A sliding plastic shroud and fiber optic support 5 is also shown.

The sliding plastic support and shroud means 5 is spring biased by a spring 6 in the outward direction away from the body of housing 4 as shown. A retaining ring 7 limits the outward travel of shroud and support means 5 by interference with a protrusion or ledge on the shroud 5 as shown. The plastic shroud and support means has an internal bore 12 which is greater than the diameter of the fiber 1 so that a variety of fiber diameters may be utilized and so that free sliding support to the end of the fiber is provided. An unsupported length of fiber 1 exists between its support in shroud 5 and its point of affixation to the housing 4 which is illustrated by the blob of adhesive 15 injected through aperture 14 during assembly of the fiber optic cable to the housing. The cable is inserted into the housing until the free end of the optical fiber protrudes from the end of the housing by a precisely fixed distance and then an amount of quick hardening adhesive is injected through aperture 14 to affix the fiber rigidly in place with respect to housing 4 as shown by the blob of adhesive 15.

A precision tunnel connector member is illustrated to the left of the main body in FIG. 1 and consists of a tunnel member having a flange 8 of semi-thickness 10 and a protruding housing length 11 measured from flange 8 as shown. There is an internal bore of the precise diameter required to accept the fiber 1 and a mating fiber 1 is shown positioned at the left of the tunnel connector and inserted to exactly the mid point of the length of the tunnel. The tunnel bore has a flared opening 9 having a larger aperture than the final minimum diameter at the center of the tunnel so that various angular displacements or lateral displacements between the bore and the free end of the optical fiber 1 may be accommodated when the connector member 8 is mated to the housing and shroud structure 4. Although any suitable materials may be employed for all of the structural elements, in the preferred embodiment, housing 4 is made of metal and the shroud and support means 5 is made of molded plastic as is the tunnel structure and flange 8. The lining of the tunnel in the connector 8 may be a glass tubing of precise diameter which has been flared to produce the greater aperture at its entrance or entrances 9.

It will be observed that until the end S of housing 4 abuts against the surface of flange 8 on the tunnel connector, that interference between the abutting surfaces of the connector tunnel and the end face of the shroud and slide support 5 will tend to force the sliding support 5 to the right against the impetus of spring 6 in FIG. 1. The amount by which fiber 1 protrudes from the end surface S of housing 4 must thus be carefully controlled at assembly of the cable to the housing. This dimension controls the total amount of protrusion from the surface of flange 8 to the center of the tunnel in the connector. A slight degree of additional protrusion may be accommodated since the free and unsupported length of fiber 1 within housing 4 can accommodate the flexure and bending and thus produce a tight abutting interface between two fibers at the center of the tunnel.

It thus appears that the only precision component is in the tunnel and flange element which may be precision molded of plastic and provided with a precise diameter glass, metal or plastic tubular element to accommodate the exact diameter of the optical fiber 1 which is employed.

Figure 2:
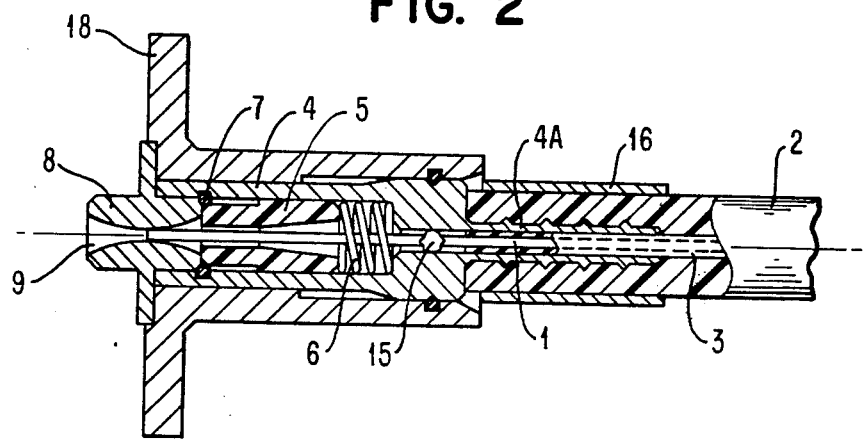
FIG. 2 illustrates the connector appratus as shown in FIG. 1 when the elements are engaged with one another.

Turning to FIG. 2, the apparatus as shown in FIG. 1 is shown with the housing 4 mated to the tunnel connector 8, and the entire assembly encased in an outer housing 18 as shown. The outer housing 18 can serve as a socket or mounting flange for holding the elements in place as they are connected to one another or for joining or terminating a fiber optical cable to light emissive or sensitive structures. It will be observed in FIG. 2 that the sliding shroud and support member 5 has been displaced to the right compressing spring 6 and that a greater portion of the fiber 1 has been exposed and guided through aperture 9 to rest at the exact center of the tunnel in connector 8 where it may be abutted by cooperating connector (not shown) from the left hand side which can also join the tunnel connector 8.

Additional components illustrated in FIG. 2 are the detent means 17 which may be a rubber retaining ring or spring loaded ball and groove as is well known, are utilized to hold the entire connector assembly engaged. A metal or other material sleeve 16 is shown positioned about the outer diameter of cable 2 to provide a tight crimp on connection between the extended tang of the fiber optic housing 4A where it penetrates the body of the fiber optical cable 2 surrounding the core which carries the fiber optic element 1 and 3. The outer metal sleeve 16 may be crimped on to provide strain relief and to provide tight affixation of the cable 2 to the housing 4 through the interaction with the toothed or threaded tang element which is an integral part of housing 4.

Figure 3:
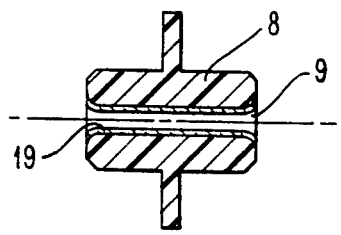
FIG. 3 illustrates a preferred embodiment of the connector device illustrated in FIGS. 1 and 2 that cooperates with the housing and fiber optic support apparatus.

In FIG. 3 a precision tunnel housing connector element 8 is illustrated with the interior lined with a precision flared glass tubing 19 which has flared entrances 9 as shown. The use of a flared glass tubing 19 provides a smooth and interference free precision tapered entrance to the precision final bore diameter at the center of the connector 8. By this means, the only element of device 8 which must be carefully controlled during manufacture is the thickness of the flange itself which limits the depth of insertion of the fiber 1 when the housing and support structure is mated to the connector 8.

FIG. 4 illustrates an alternative preferred embodiment for utilization with flat or round multi-fiber optical cables. A fiber optic cable 2 having multiple fiber optical conductors 1 is illustrated. The separate fiber optical conductors 1 are separated in a star shaped separator 20 in cooperation with a tapered separator 21 to create a flared array of individually identified separate conductors 1. The individual separate conductors in a flared array pass through a rubber (or other similar material) retaining clamp made of conically cooperating elements 22 and 23 as shown. These serve to grip the individual fibers 1 and hold them in the spaced array produced by the spacer 20 in cooperation with the separator 21. The fibers 1 are locked in position by turning the threaded fastener 24 to compress the annular rubber plug 23 into the tapered bore of the annular ring 22. The result is a flared array of individually separated fibers 1 as shown.

The fibers pass through individual apertures 12 in a slidable shroud and support means 5 similar to that shown in the preceding figures. The shroud and sliding support 5 has individual guiding projections 26 for each fiber which surround and project from the opening of the aperture 12 in the shroud for each fiber. A spring bias 6 and a free and unsupported length of each fiber 27 are also included. A central guidance projection 25 may be employed if desired to aid in mating the elements together with a suitable connector not shown in FIG. 4. A groove for use with a retaining ring or spring and ball structure is shown as groove 17 in the housing 4 in FIG. 4. A cable clamp 16 made of metal or other suitable material has been employed with the cable 2 and the separator 20 and mates with the housing 4 when the threaded fastener 24 is tightened. A further threaded fastener is utilized to hold the cable clamp 16 together and may employ either a round or a flat clamping surface depending on whether a round multi-strand cable or a flat one is used.

During assembly, an uncontrolled length of each fiber 1 is stripped of its covering and inserted through the apparatus as shown in FIG. 4. A tool is utilized to simultaneously cut all of the fibers with the sliding shroud and retainer means slightly depressed against spring 6 so that the fiber's ends will protrude a fixed and carefully controlled distance from the end surface S of housing 4 as with the embodiment for the single fiber conductor.

Figure 5:
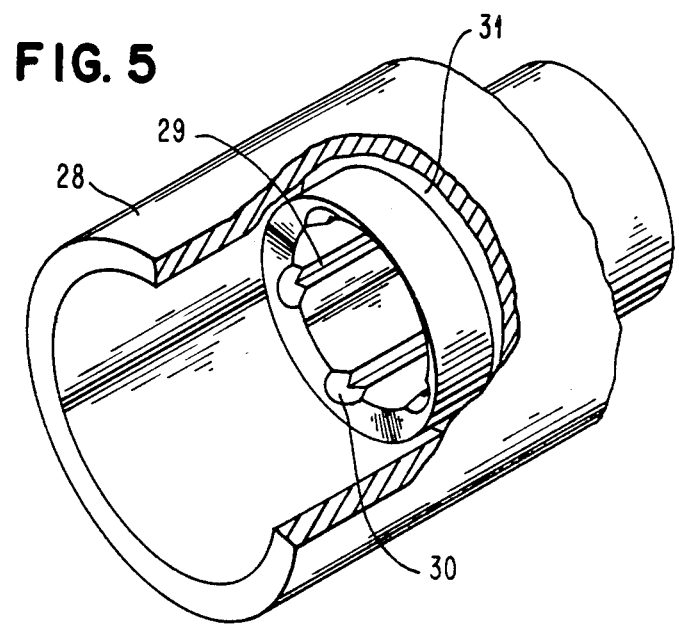
FIG. 5 illustrates a preferred form of a cooperating connector for use with the support structure and housing for the multi-fiber optic cable device shown in FIG. 4.

Turning to FIG. 5, a cooperating socket or connector element 28 is illustrated for use with the multi-strand support and housing shown in FIG. 4. This connector element 28 is provided with multiple internal guide surfaces 29, a set of guide surfaces being provided for each individual fiber. The guide surfaces tend to align the fibers coming from opposite ends of the connector 28. An additional guide surface or surfaces 30 are utilized and cooperate with the tapered projections 26 on the end of the shroud and fiber support 5 which is employed with each housing and support assembly 4. The end surface S of the housing 4 is intended to abut against surface 31 when the connector 28 is fully mated against the housing assembly. The fiber support and shroud 5 as shown in FIG. 4 is constructed to create a degree of arcuate bending and consequent stress in each of the fibers 1. The cooperating connector 28 further provides this bending and stressing effect by the interaction of its guide surfaces 29 on the free ends of the fibers 1. This condition is shown to greater effect in the enlarged partial section in FIG. 6.

Figure 6:
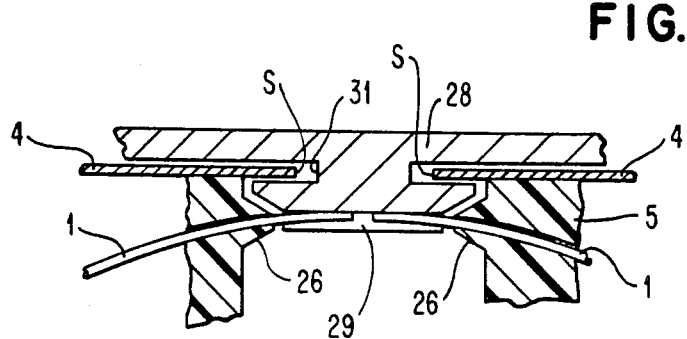
FIG. 6 illustrates an enlarged schematic view of the cooperating elements for the alternative preferred embodiment shown in FIGS. 4 and 5 and their method of interaction to stress the optical fibers to provide precision contact between them and the guiding surfaces in the connector.

In FIG. 6, two separate fiber optic cable support and shroud members 5 are shown coming into the connector 28 from the left and right respectively. The free ends of fiber 1 will be exposed by interference between the projections 26 and the guide surfaces 30. This will stop the movement of the sliding shroud and supports 5 in each of the connector assemblies so that the individual fibers 1 will continue to slide through the projections 26 of the apertures therein and enter the V-shaped groove guiding surface areas 29 in connector 28. Total insertion of the fibers ends when the end S on housing 4 contacts the surface 31 on connector 28 as mentioned previously.

The V-shaped grooves illustrated in the preferred embodiment constitute guiding surfaces 29 and are arranged in a concentric array having a diameter smaller than the unsupported or free diameter that would exist at the free and unsupported ends of the fibers 1 where they emerge through the apertures 12 in the projections 26 on the guide and support means 5 in each of the connector devices as shown in FIG. 4. This means that the fibers 1 are caused to converge slightly by the action of the guide surfaces 29 and create some bending stresses in the fibers. These stresses tend to hold the fibers 1 in tight conformity at the bottom of each of the V-shaped groove surfaces 29 to provide for precision alignment in the connector 28. Careful control of the degree of the projection of fibers 1 pass the end S of each housing 4 at assembly of the cable to the housing provides the degree of insertion to cause abuttment between the ends of each fiber in the center of connector 28. Any slight excess protrusion can be accommodated by the free and unsupported length 27 shown in FIG. 4 for each of the fibers within the housing and support portion of the structure.

Each of the housings has a central axial cavity as depicted in the Figures which extends completely through the connector. The slidable fiber shroud and support means both supports and protects the free ends of the fibers in each of the embodiments and, when fully extended, completely covers each of the fiber ends. Thus the free ends of the fibers may be easily guided into the vicinity of the flared or guide surface openings in the cooperating respective connector elements in a precise and easily controlled manner. Once the initial insertion of each of the fibers into the appropriate aperture is accomplished, the guide surfaces in the precision tunnel or guide surface grooves of the preferred embodiment take over to direct the free end of the fibers into precise and tight abuttment with cooperating elements in the connector. The piloting projections 26 on the multi-fiber connector embodiment have means for guiding the fibers and the shroud into engagement with the multi-fiber connector 28 by their tapered external surfaces which cooperate with tapered internal surfaces 30 on the connector 28 as shown.

As will be apparent to those of skill in the art, while an initial divergent array of the individual fibers within the housing 4 in FIG. 4 are shown, a convergent array of fibers with subsequent divergence inside of a connector housing 28 could be equally contemplated since it is the creation of bending and flexing in the fibers 1 that is the desired result. Some offset between the free and unsupported ends of the fibers and their eventual connected array diameter must be provided in order to produce this effect.

It will be observed that the preferred embodiments of the fiber optical connectors depicted and described in the specification may be easily constructed in great quantities and at low cost since the only precision elements involved are, in the case of the single fiber connector, the tunnel bore diameter and the thickness of the flange which separates the two ends of the connector device. In the multi-fiber connector assembly, similar provisions occur except that the total length of the connector 28 or of a flange if such is employed must be controlled. The individual V grooves need not be of great precision as shown in connector 28 since the flexing action produced by guide surfaces 29 on the free ends of fibers 1 accommodates for any lack of precision diameter tunnel and creates instead a precision V groove in which the round fibers 1 (off any diameter) may lie in tight conformance in alignment with one another without the need of a precision bore as with the single fiber connectors.

Having thus described my invention with reference to several preferred embodiments thereof, it will be obvious to those of skill in the art that many departures in the exact dimensions and arrangement of the elements may be contemplated without departing from the essential concepts of the designs employed which produce the precision joining and coupling of the individual fibers as shown. Therefore, the preferred embodiments are to be viewed as illustrations only and not by way of limitation.

What is desired to be protected by Letters Patent and what is claimed is:

1. Optically transmissive fiber connector apparatus, comprising:
 a housing means having a central axial cavity extending therethrough;
 at least one optically transmissive fiber having a free end thereof inserted into said cavity at one end thereof and extending outward therefrom at the other end thereof;
 means for affixing said fiber to said housing with the free extending end of said fiber at a fixed and controlled distance from a reference surface on said housing;
 a longitudinally slidable fiber support and shroud means surrounding and slidingly supporting at least the free end of said fiber extending from said housing;
 resilient mounting means in contact with said sliding support and shroud means for urging said support and shroud means outward from said housing;
 a connector means having a flared aperture therethrough, said flared aperture having at least one surface opening of a dimension greater than that of said aperture at a point within said connector along the axis of said aperture, said aperture receiving and guiding said free end of said fiber which extends outward from said housing;
 said connector having means for abutting said sliding support and shroud means and forcing the same backward against the urging of said resilient means when said housing and shroud assembly are brought into engagement with said connector, the wall surfaces of said flared aperture contacting and guiding the free end of said fiber into accurate placement at the center and on the axis of said aperture.

2. Apparatus as described in claim 1 and further comprising:
 said connector having at least two of said flared apertures therein, said apertures being axially colinear and providing a connection for abutting two said fibers together in the common center of said apertures.

3. Optically transmissive multi-fiber connector apparatus, comprising:
 a housing means having a central axial cavity extending therethrough;
 a plurality of optically transmissive fibers, each fiber having a free end thereof inserted into said cavity at one end of said housing and extending outward therefrom at the other end thereof;
 means for affixing said plurality of fibers to said housing with the ends thereof extending therefrom at a fixed distance from a reference surface on said housing;
 means located near the entry of said plurality of fibers into said housing for separating said fibers into individually spaced and flared array with respect to the central axis of said housing;
 a longitudinally slidable fiber support and shroud means having a plurality of apertures therein, at least one aperture for each said fiber and each said aperture receiving and slidably supporting one said fiber therein;
 said fiber support and shroud means having, coaxial with each said aperture, an extended pilot projection means for guiding said fibers and shroud into engagement with a connector means with said apertures in said fiber support and shroud means being in alignment with mating apertures in said connector means;
 a connector means having a plurality of internal guide surface means for individually and separately receiving said projecting ends of said fibers and directing and displacing them to lie separately and symmetrically with respect to the central axis of said connector and at a distance therefrom which is different from that at which they enter said connector, thereby inducing flexure and bending stresses into said fibers which cause them to lie in contact with said guide surfaces; and
 means in said housing for providing an unsupported length in each said fiber between said affixing means and said shroud means to permit buckling of said fibers due to flexing or abutting thereof within said connector.

4. Apparatus as described in claim 3, wherein:
 said extended pilot projection means on said shroud means are externally tapered to provide guiding surfaces for said projections and said shroud;
 said connector is provided with internally tapered guide surfaces for each said pilot projection on said shroud means, said pilot projection guide surfaces being in symmetrical disposition with respect to each of said internal fiber guiding surfaces that said pilot projections and respective shroud apertures are brought into alignment with said fiber guiding surfaces within said connector whenever said shroud and fiber support assembly is mated to said connector.

5. Apparatus as described in claim 1 or 2 or 3 or 4 wherein:
 said connector means is made of a porous material which is impregnated with a liquid having an index of refraction which matches that of the material of said fibers to improve the optical transmission coupling between the free ends of said fibers when inserted in said connector.

* * * * *